(12) United States Patent
Lu et al.

(10) Patent No.: US 11,481,858 B2
(45) Date of Patent: Oct. 25, 2022

(54) PEAK PERIOD NETWORK CAPACITY PLANNING

(71) Applicant: Walmart Apollo, LLC, Bentonville, AR (US)

(72) Inventors: Jie Lu, San Bruno, CA (US); Yilei Shi, Burlingame, CA (US); Ruoxuan Wang, San Bruno, CA (US); Xiaoli Ling, San Bruno, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 17/027,119

(22) Filed: Sep. 21, 2020

(65) Prior Publication Data

US 2022/0092717 A1    Mar. 24, 2022

(51) Int. Cl.
*G06Q 50/28*     (2012.01)
*G06Q 10/06*     (2012.01)

(52) U.S. Cl.
CPC ........... *G06Q 50/28* (2013.01); *G06Q 10/067* (2013.01); *G06Q 10/06315* (2013.01); *G06Q 10/06316* (2013.01)

(58) Field of Classification Search
CPC ............. G06Q 50/28; G06Q 10/06315; G06Q 10/06393
See application file for complete search history.

(56) References Cited

U.S. PATENT DOCUMENTS 7,747,543 B1 *   6/2010   Braumoeller ........ G06Q 10/083
                                                                                705/330
9,466,043 B1    10/2016   Agarwal et al.
9,754,238 B2    9/2017   Lyon et al.
10,360,522 B1 *   7/2019   Leonard .......... G06Q 10/06315
10,867,309 B1 *   12/2020   Wang ..................... G06F 30/20
(Continued)

FOREIGN PATENT DOCUMENTS

CA         2299825 A1 *   9/2001    ........... G06Q 10/087

OTHER PUBLICATIONS

Hompel, Michael, and Thorsten Schmidt. Warehouse management: automation and organisation of warehouse and order picking systems. Springer Science & Business Media, 2006. (Year: 2006).*

(Continued)

*Primary Examiner* — Patricia H Munson
*Assistant Examiner* — Hamzeh Obaid

(57) ABSTRACT

A solution for capacity planning includes: for each of a plurality of fulfillment centers (FCs), receiving an inventory allocation; receiving a demand forecast and delivery time information for customer orders; performing a simulation comprising: partitioning a simulation period into multiple simulation stages; for each simulation stage: assigning portions of the demand forecast to a demand pool for one of the FCs; for each FC, determining a backlog, based at least on the demand pool for the FC and a simulation stage fulfillment capacity for the FC; and transferring each existing backlog to a subsequent simulation stage or an alternate FC; and based at least on the simulation, generating at least one planning control logic action, for example, adjusting delivery time options available on an e-commerce node, identifying a change in staffing levels at one or more FCs, adjusting inventory allocation for at least one FC, or another action.

19 Claims, 9 Drawing Sheets

(56) References Cited

U.S. PATENT DOCUMENTS

| | | | |
|---|---|---|---|
| 10,997,550 B1* | 5/2021 | Rehn | H04W 4/029 |
| 2005/0144053 A1* | 6/2005 | Mauthe | G06Q 10/06375 |
| | | | 705/7.37 |
| 2008/0015721 A1* | 1/2008 | Spearman | G06Q 10/06 |
| | | | 705/28 |
| 2008/0162270 A1 | 7/2008 | Kim et al. | |
| 2016/0171584 A1* | 6/2016 | Cao | G06Q 30/0625 |
| | | | 705/26.62 |
| 2017/0323250 A1 | 11/2017 | Lindbo et al. | |
| 2018/0314999 A1 | 11/2018 | Nemati et al. | |
| 2019/0378070 A1* | 12/2019 | Zhu | G06Q 10/06315 |
| 2020/0160269 A1* | 5/2020 | Calvo | G06Q 30/0633 |
| 2020/0293968 A1* | 9/2020 | Ma | G06Q 10/06315 |
| 2020/0357040 A1* | 11/2020 | Patel | G06Q 10/087 |
| 2021/0026706 A1* | 1/2021 | Minh | G06F 9/505 |
| 2021/0089985 A1* | 3/2021 | Gu | G06Q 10/067 |
| 2021/0209181 A1* | 7/2021 | Rehn | G06Q 10/087 |
| 2021/0312378 A1* | 10/2021 | Kim | G06Q 10/087 |

OTHER PUBLICATIONS

Carbonneau, Real, Kevin Laframboise, and Rustam Vahidov. "Application of machine learning techniques for supply chain demand forecasting." European Journal of Operational Research 184.3 (2008): 1140-1154. (Year: 2007).*

* cited by examiner

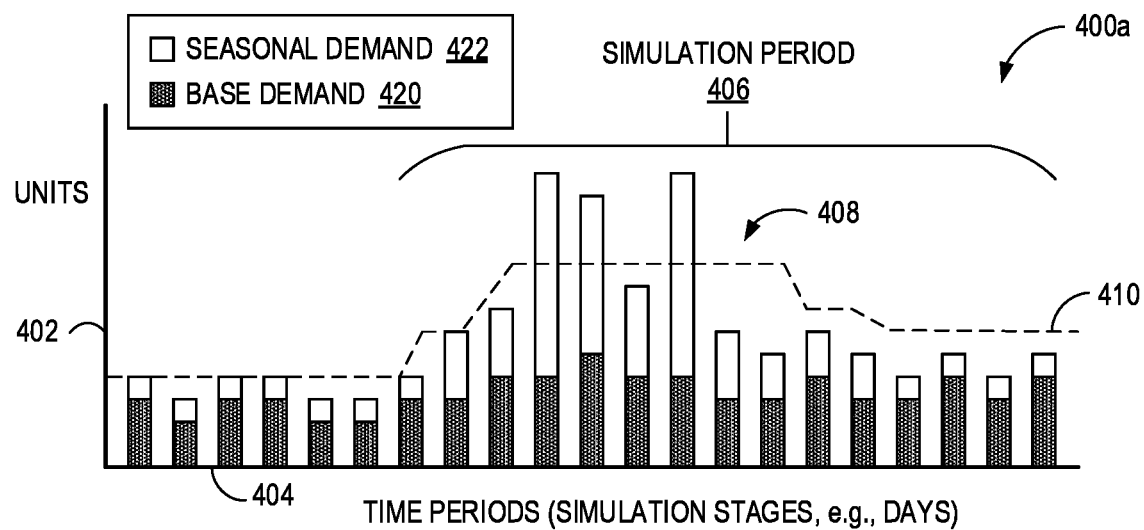

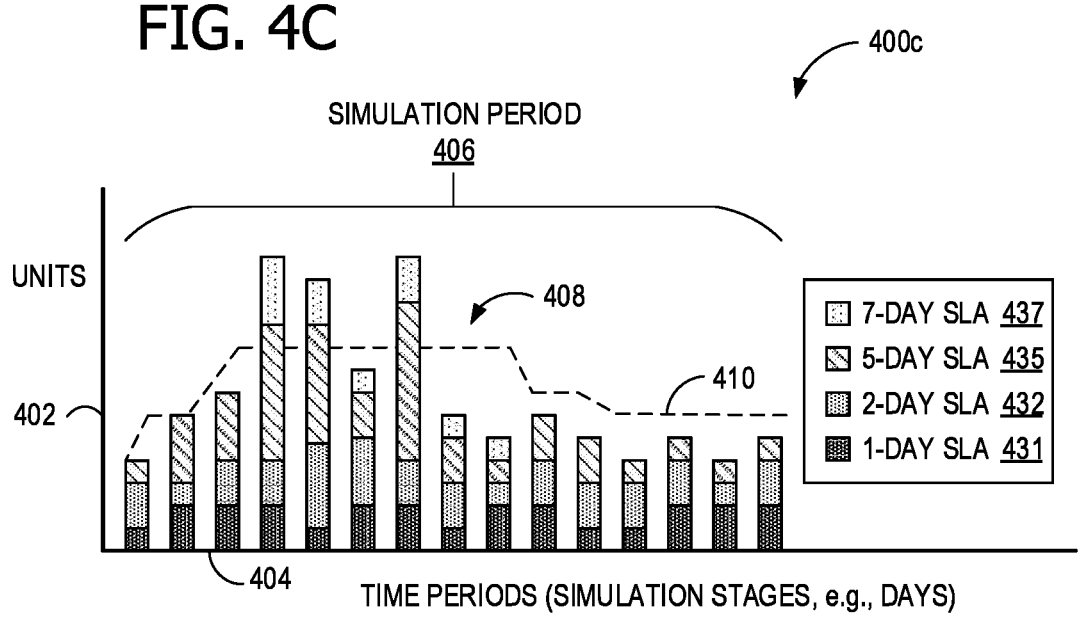
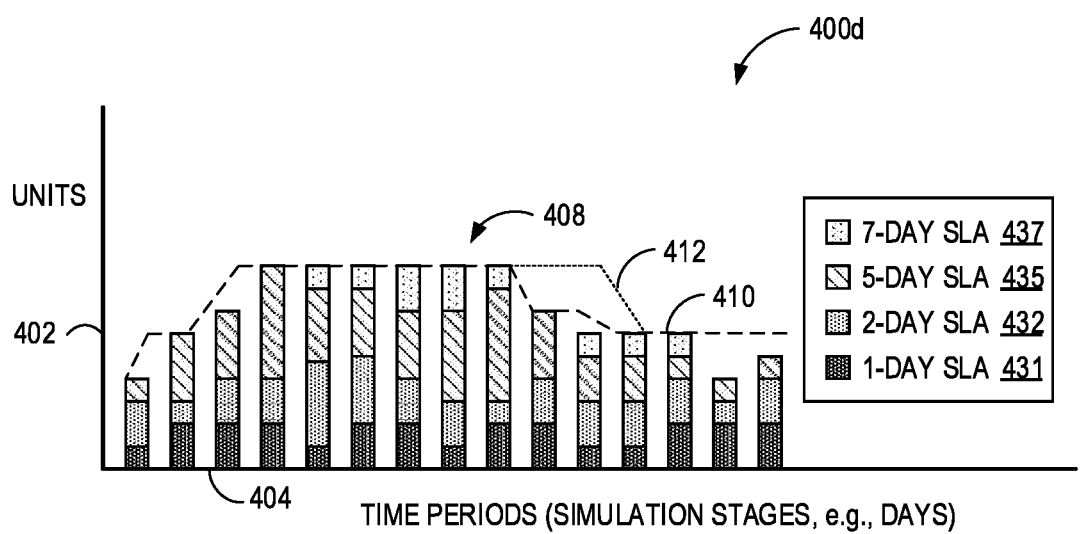

PEAK PERIOD NETWORK CAPACITY PLANNING

BACKGROUND

In large e-commerce environments, properly planning fulfillment capacity, such as by stocking and staffing fulfillment centers (FCs), contributes to efficient operations. Understaffing risks frustrating customers with missed delivery dates (e.g., breaking service level agreements, SLAs), while overstaffing risks inefficient use of budget and suboptimal resource utilization. Although forecasting tools exist, which often use historical data, customer purchasing behavior largely depends on events such as holidays, sales promotions, weather incidents, and other events. Multiple factors may complicate planning, such as demand spikes during peak periods (holiday seasons), in which the daily demand may increase sharply. Additionally, for e-commerce applications, different delivery date promises (e.g., SLAs) may co-exist within the daily demand forecast, resulting in differences for fulfillment deadlines in demand fragments (e.g., different customer orders) received on the same day.

Common resource optimization techniques, which seek to efficiently allocate resources to demand, require solving a multi-dimensional problem as a simultaneous solution. In large e-commerce environments, such techniques may rapidly become intractable, due to the high number of variables and constraints.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

A solution for capacity planning includes: for each of a plurality of fulfillment centers (FCs), receiving an inventory allocation; receiving a demand forecast and delivery time information for customer orders; performing a simulation comprising: partitioning a simulation period into multiple simulation stages; for each simulation stage: assigning portions of the demand forecast to a demand pool for one of the FCs; for each FC, determining a backlog, based at least on the demand pool for the FC and a simulation stage fulfillment capacity for the FC; and transferring each existing backlog to a subsequent simulation stage or an alternate FC; and based at least on the simulation, generating at least one planning control logic action, for example, adjusting delivery time options available on an e-commerce node, identifying a change in staffing levels at one or more FCs, adjusting inventory allocation for at least one FC, or another action identified herein.

BRIEF DESCRIPTION OF THE DRAWINGS

The disclosed examples are described in detail below with reference to the accompanying drawing figures listed below:

FIGS. 4A, 4B, 4C, and 4D are plots of demand and fulfillment timelines, including a peak period, as may be planned for by the arrangement of FIG. 1;

Figure 1:
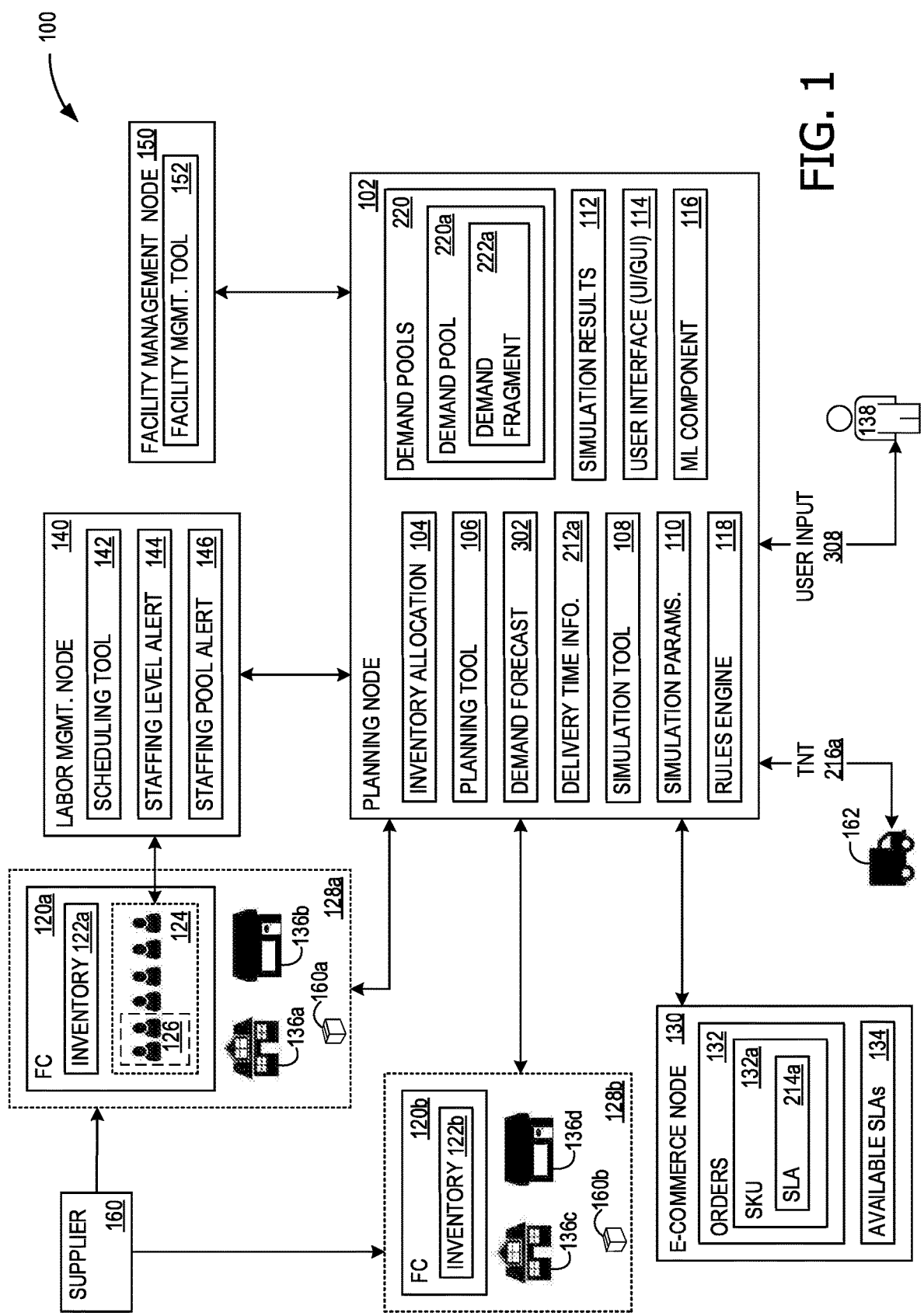
FIG. 1 illustrates an exemplary arrangement that advantageously provides efficient peak period network capacity planning.

Corresponding reference characters indicate corresponding parts throughout the drawings. Elements in the figures are illustrated for simplicity and clarity and have not necessarily been drawn to scale. For example, the dimensions and/or relative positioning of some of the elements in the figures may be exaggerated relative to other elements to help to improve understanding. Also, common but well-understood elements that are useful or necessary in a commercially feasible embodiment may not be depicted, in order to facilitate a less obstructed view.

DETAILED DESCRIPTION

A more detailed understanding may be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that may in isolation and out of context be read as absolute and therefore limiting, may only properly be read as being constructively preceded by a clause such as "In at least some embodiments, . . . " For brevity and clarity, this implied leading clause is not repeated ad nauseum.

Aspects of the disclosure advantageously perform peak period network capacity planning in an unconventional way, side-stepping an attempt to solve an intractable a multi-dimensional optimization problem, by partition a simulation into multiple simulation stages and resolving performance bottlenecks in those stages. For example, an inventory allocation is determined for each of a plurality of fulfillment centers (FCs), and then a simulation is performed with a daily increment (or other time period), to predict timeliness of customer order fulfillment. Parameters of the simulation may be adjusted in response to predicted backlogs, such as FC staffing, inventory allocation, adjustment to delivery time options available to customers (e.g., on an e-commerce node), and other factors. Results of the simulation may then be used to drive real-world network capacity planning, for example, during seasonal (e.g., holiday) sales spikes.

Aspects of the disclosure provide a practical technical solution that improves operational efficiency by, based at least on the simulation, generating at least one planning control logic action, for example, alerts to users or adjustments to parameters of an e-commerce node (e.g., delivery time options available to customers). In some examples, a short-term planning control logic action may be an adjustment to delivery time options available on an e-commerce node (e.g. a service level agreements, SLA), an alert identifying a change in staffing levels at one or more FCs, and/or a reassignment of at least one portion of a demand forecast to an alternate FC. In some examples, a near-term planning control logic action may be an adjustment to inventory allocation for at least one FC, and/or an alert identifying a change in staffing pool levels at one or more FCs. In some examples, a long-term planning control logic action may be an alert identifying a change in infrastructure capacity for at least one FC.

For example, a solution for capacity planning includes: for each of a plurality of FCs, receiving an inventory allocation; receiving a demand forecast and delivery time information for customer orders; performing a simulation comprising: partitioning a simulation period into multiple simulation stages; for each simulation stage: assigning portions of the demand forecast to a demand pool for one of the FCs; for each FC, determining a backlog, based at least on the demand pool for the FC and a simulation stage fulfillment capacity for the FC; and transferring each existing backlog to a subsequent simulation stage or an alternate FC; and based at least on the simulation, generating at least one planning control logic action, for example, adjusting delivery time options available on an e-commerce node, identifying a change in staffing levels at one or more FCs, adjusting inventory allocation for at least one FC, or another action identified herein.

Based upon a sales forecast (a demand forecast), aspects of the disclosure depict delayed delivery times to be expected by customers during and subsequent to a selected number of days of peak holiday sales, or other peak demand periods. Example inputs include (1) holiday sales forecast, (2) capacity of each FC, and (3) a selected number of top selling items (identified according to stock keeping units (SKUs). In some examples, 3,000 SKUs are used. Throughput is modeled, enabling predicting the percentage of orders which will be delivered within one day, two days, five days, and seven days after receipt of order. The number of seasonal SKUs to preposition at each FC is also determined. A rules engine determines which orders will be fulfilled quickly and which to delay. An exemplary rule will provide 7-day delivery for holiday SKUs, whereas household supplies may typically be delivered within 1-day or 2-day SLAs.

In some examples, FCs having fewer orders assigned, than the FC is able to fulfill, may be automatically tasked to fulfill orders in place of another FC that is operating at full capacity and yet cannot fulfill all assigned orders (demand). In some examples, postal zip codes of orders are used to identify an overflow FC. In some examples, users may use a graphical interface to shift zip code order fulfillment or alter the percentage of orders in each SLA to model (simulate) the resulting network behavior.

Aspects of the disclosure enables planning of both inventory allocation to FCs (e.g., prepositioning holiday SKUs) and staffing needed for peak periods. Benefits include maximizing the number of customer orders that may be promised for delivery in one or two days, while pushing out remaining units to a later promise date, recommending inventory allocation within the storage capacity (cube capacity) limitation of each FC, and synchronizing backlog-clear dates at various FCs to allow the return of normal customer promise dates on a website that serves customers across multiple delivery areas. Additional benefits include providing calculation-based guidance on the number of temporary workers to be hired and the length of employment during the peak periods, rather than such labor planning relying on guesses or purely historical data. Other additional benefits include that capacity may be secured in advance from a transport provider that delivers customer orders, in which the transport provider may be informed of the FC from which to collect the customer orders. Such awareness may assist the transport provider with beneficial planning information. Aspects of the disclosure thus determine optimal inventory allocation across each FC, to balance capacity while adhering to delivery date promises made to customers (which includes transportation delays).

FIG. 1 illustrates an exemplary arrangement 100 that advantageously provides efficient peak period network capacity planning. Arrangement 100 uses a planning node 102, which may be a distributed network of nodes, to plan capacity as a plurality of FCs, for example, FC 120a and FC 120b. It should be understood that, in some examples, the number of FCs may be significantly larger. Planning node 102 has a planning tool 106 and a simulation tool 108, the operations of which will be described in relation to the following FIGS. 2-7. In some examples, planning node 102 may be implemented with one or more computing nodes 800, described in relation to FIG. 8.

In an exemplary e-commerce scenario, customers place orders 132 using an e-commerce node 130, such as a sales-oriented website. During a customer visit to e-commerce node 130, when a customer has selected a product and is completing the order, e-commerce node 130 presents to the customer a set of available service level agreements (SLAs) 134, which provide the customer a set of optional delivery times. For example, available SLAs 134 may be 1-day, 2-day, 5-day, and 7-day delivery options. In some scenarios, as will be indicated below, planning tool 106 may automatically restrict available SLAs 134 so that 1-day, 2-day, and/or 5-day delivery options are not available. For example, if simulation tool 108 had predicted (as shown in simulation results 112) that neither FC 120a nor FC 120b will be able to meet a 1-day or 2-day SLA (even with increased staffing levels), then a rules engine 118 will delay selected orders, for example holiday SKUs. Based on the simulation, the customer is presented with available SLAs 134 for only 5-day and 7-day delivery options on e-commerce node 130. In some examples, available SLAs 134 will vary based on the SKUs, so a customer may be presented with differing available SLAs 134 within a particular order that includes multiple SKUs. As indicated, a customer has selected a specific SLA 214a (from available SLAa 134) for a particular SKU 132a in an order.

Together, planning tool 106 and simulation tool 108 provide for efficient capacity planning (e.g., FCs are neither overwhelmed nor under-utilized) for FC 120a and FC 120b. FC 120a has inventory 122a, and serves customers at delivery locations (e.g., delivery location 136a and delivery location 136b) within a delivery area 128a. In some examples, boundaries of delivery area 128a correspond to postal zip code boundaries, for example a set of zip codes having the same initial three numbers. FC 120a has a staffing pool 124, which is a group of laborers who may be scheduled to work within FC 120a to fulfill customer orders for shipment to delivery locations 136a and 136b. As indicated, scheduled staff 126 is currently scheduled for work shifts from staffing pool 124. FC 120b is similarly stocked and staffed, for example with inventory 122b, and services delivery locations (e.g., delivery location 136c and delivery location 136d) within a delivery area 128b. However, as will be indicated below, in some scenarios, FC 120a may fulfill a customer order within delivery area 128b, and in some other scenarios, FC 120b may fulfill a customer order within delivery area 128a. Inventories 122a and 122b are determined by an inventory allocation component 104 at planning node 102, which optimizes inventories at FCs, and are received from a supplier 160.

A labor management node 140 includes a labor scheduling tool 142, which tasks staffing pool 124 by scheduling work shifts for scheduled staff 126. Labor management node 140 receives a staffing level alert 144 identifying a change in staffing levels at one or more FCs (FC 120a and/or FC 120b), for example, increasing the count of scheduled staff 126 in order to provide a higher throughput capacity for FC 120a, in order to meet increased fulfillment demand. Labor management node 140 also receives a staffing pool alert 146 identifying a change in staffing pool levels at one or more FCs (e.g., FC 120a and/or FC 120b), for example, increasing the count of staffing pool 124 (e.g., hiring more workers) in anticipation of increases in the count of scheduled staff 126 during a peak demand period. In this manner, planning tool 106 and simulation tool 108 are able to provide automatically calculated counts of labor force requirements, both of staffing pool 124 (total number of hired workers), and scheduled staff 126 (the number of workers scheduled for a specific work shift). In some examples, labor management node 140 may be implemented with one or more computing nodes 800, described in relation to FIG. 8.

Identifying a change in staffing levels is a short-term action, because it may be acted upon within a matter of days and its effects endure for a period of time that is measureable in hours. Identifying a change in staffing pool levels is a near-term action, because it may be acted upon within a matter of a week or more and its effects endure for a period of time that is measureable in weeks or months. In some examples, a facility management node 150 has a facility management tool 152 that receives and processes alerts identifying a change in infrastructure capacity for at least one FC (e.g., FC 120a or FC 120b). For example, facility management tool 152 may provide an automated recommendation that FC 120a upgrades or decommissions inventory management equipment, expand or downsize, and/or that a new FC be provides (e.g., built or purchased). Identifying a change in infrastructure capacity is a long-term action, because it may be acted upon within a matter of months and its effects endure for a period of time that is measureable in years. In some examples, facility management node 150 may be implemented with one or more computing nodes 800, described in relation to FIG. 8.

A transport provider 162 provides transportation of fulfilled customer orders (e.g., fulfilled order 160a and fulfilled order 160b), and also provides time in transit (TNT) prediction 216a, so that planning tool 106 is able to estimate delivery time information 212a for customer orders. A user 138 makes advantageous use of planning tool 106 and simulation tool 108, and provides user input 308 via a user interface (UI) 114, which may be a graphical user interface (GUI). For example, user input 308 may set or edit at least some of simulation parameters 110 and reassign a portion of demand forecast 302 from a first FC to a second FC (e.g., have FC 120a fulfill a customer order in delivery area 128, when FC 120b is too busy).

Simulation tool 108 performs a simulation of FC fulfillment over a simulation period that is partitioned into multiple simulation stages, such as days. In some examples, a multi-day or multi-week simulation is performed with each simulation step corresponding to a day or a business day (in the event of holiday or other closures). The simulation iterates over the stages, with delays and bottlenecks resolved at each stage, such as by delaying fulfillment of orders having longer promised delivery times (e.g., 5-day or 7-day SLAs versus 1-day or 2-day SLAs) or having another FC help out in a neighboring delivery area. This produces simulation results 112 that include predictions regarding timeliness of customer order fulfillment with identified staffing levels at various FCs. Predicted demand is allocated into demand pools 220, with a specific demand pool for each FC, for example, demand pool 220a for FC 120a. Each demand pool may be further segmented into a demand fragment, such as demand fragment 222a of demand pool 220a. A demand fragment is a portion of the total demand forecast that may be reassigned to alternate FC, which has capacity to fulfill customer orders for a nearby delivery area (e.g., FC 120a fulfilling a customer order within delivery area 128b, or FC 120b fulfilling a customer order within delivery area 128a).

In some examples, planning tool 106 and simulation tool 108 use artificial intelligence (AI) or machine learning (ML), together referred to as ML. Planning tool 106 and/or simulation tool 108 may include an ML component 116. In some examples, planning tool 106 automatically adjusts available SLAs 134 on e-commerce node 130. In some examples, planning tool 106 automatically adjusts an FC staffing level in labor scheduling tool 142. In some examples, planning tool 106 automatically requests capacity from transport provider 162. Further details regarding FIG. 1 will be provided in the descriptions of FIGS. 2-6.

Figure 2:
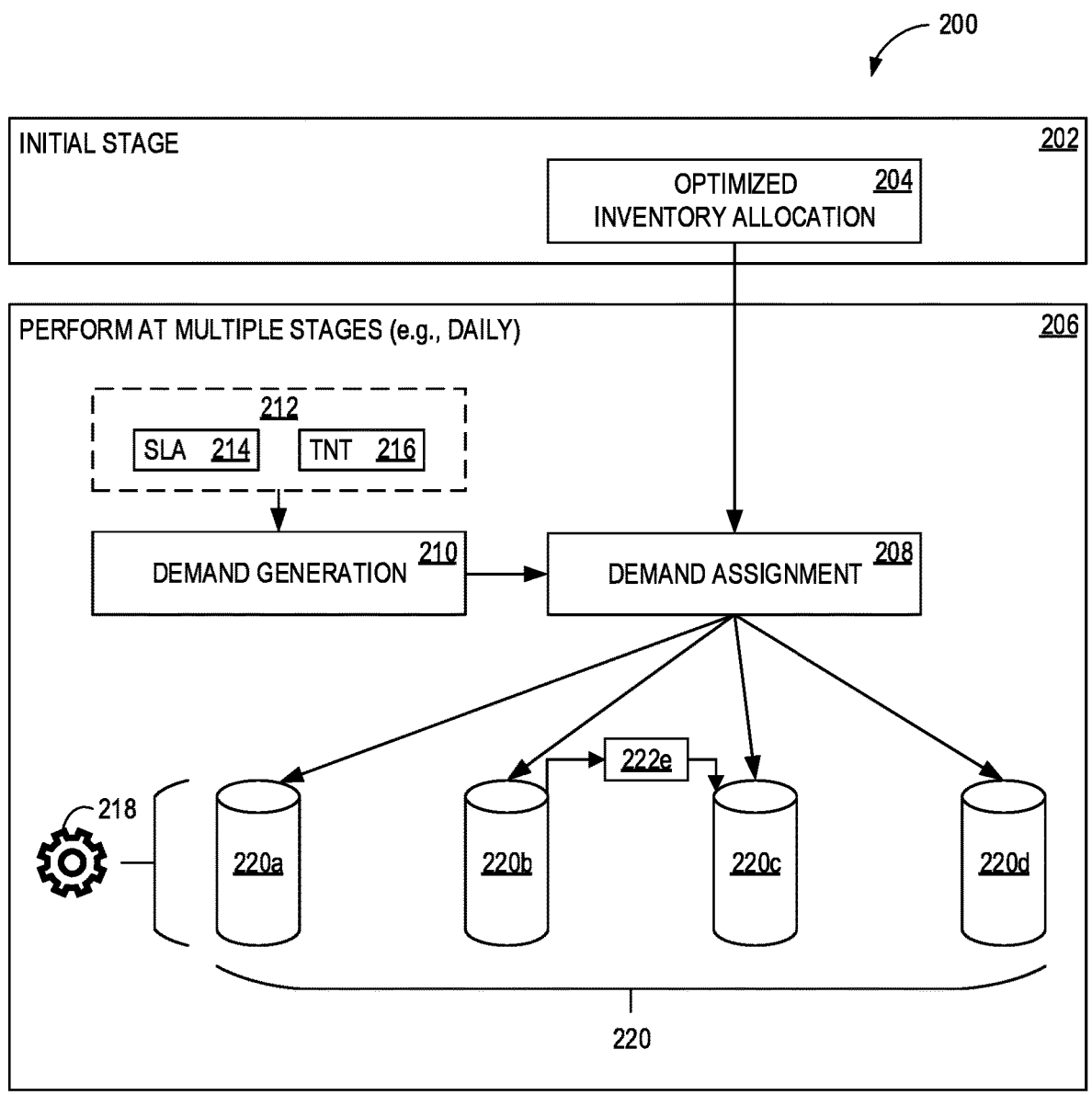
FIG. 2 shows a representation of an exemplary simulation framework that may be used with the arrangement of FIG. 1.

FIG. 2 shows a representation of an exemplary simulation framework 200 as may be implemented by simulation tool 108. Simulation framework 200 includes an optimized inventory allocation 204 (which is performed by inventory allocation component 104), a demand generation 210, a demand assignment 208, and a demand processing 218. Inventory allocation 204 determines the optimal allocation of SKUs across different FCs (e.g., assigning inventories 122a and 122b to FCs 120a and 120b). The optimization results provides both seasonal and non-seasonal SKU allocation, using an estimate of the daily total demand for each FC. In some examples, FC demand percentage is optimized using zip code level demand information, FC throughput capacity, and FC cube capacity (storage capacity for SKUs). That is, in some examples, for each simulation stage (e.g., each simulation day), the daily demand is segmented into a regional demand using a pre-assigned demand distribution. In some examples, optimized inventory allocation 204 is performed a single time for each simulation in an initial stage 202.

Demand generation 210, demand assignment 208, and a demand processing 218 are then performed at each stage interval, for example, on a simulated daily basis, in a multi-stage simulation portion 206. For each simulation stage, demand from different delivery areas (e.g., delivery areas 128a and 128b) generated by demand generation 210 and assigned, by demand assignment 208, to different FCs based on shipping cost and time (including TNT and/or shipping distance) and current simulated FC backlog. Demand generation 210 uses delivery time information 212, which includes an SLA distribution 214 and a TNT distribution 216. SLA distribution 214 and TNT distribution 216 provide aggregated information which may be estimated or compiled from individual specific SLAs (e.g., SLA 214a) and TNT predictions (e.g., TNT prediction 216a). SLA distribution 214 and TNT distribution 216 are illustrated in further detail in FIG. 5.

Demand assignment 208 and demand processing 218 are performed to obtain simulated FC level backlog information. When demand assignment 208 assigns a portion of the demand to an FC, the shipping distance and TNT from the FC becomes known. This enables determination of a shipping deadline for each demand fragment, by which time the demand fragment (e.g., sets of customer orders) should be fulfilled and turned over to transport provider 162 in order to meet the SLA. For example, for a 5-day SLA and a 3-day TNT, the FC has two days to fulfill a customer order and turn it over to transport provider 162. If transport provider 162 meets its 3-day TNT promise, the customer will have the order by the promised five days. Using the historical percentage for SLA categories (e.g., 1-day, 2-day, 5-day, and 7-day), demand is further segmented into different demand fragments (e.g., demand fragments 222a and 222e) with different SLA. For each SLA category, using TNT distribution 216 for different regions, demand may be further segmented into demand fragments with different SLA promises and TNT information.

Based on its SLA and TNT, each demand fragment has a fulfillment deadline, and is assigned to an FC demand pool, such as demand pool 220a (for FC 120a), demand pool 220b (for FC 120b), demand pool 220c, or demand pool 220d. Demand processing 218 ranks demand fragments in the demand pool for each FC, based (at least partially upon) their shipping deadlines. There will be a fulfillment backlog for an FC if its fulfillment capacity is less than the total demand in its demand pool, for a simulation stage. In such a scenario, the FC sends its backlog to demand assignment 208 for the next step decision. The next step decision may include fulfilling that demand fragment at the same FC but on a subsequent day or assigning that demand fragment to a nearby FC that has available fulfillment capacity. As a demonstrated example, demand fragment 222e is moved from demand pool 220b to demand pool 220c, to be fulfilled by a different FC. Thus, network capacity planning and staffing is performed based on simulation of daily demand assignment at a central level, and demand processing is performed at a bottom FC level. The simulation tracks the demand backlog at each FC and sends back the backlog quantity for the next step decision that re-balances the demand assigned to each FC.

Figure 3:
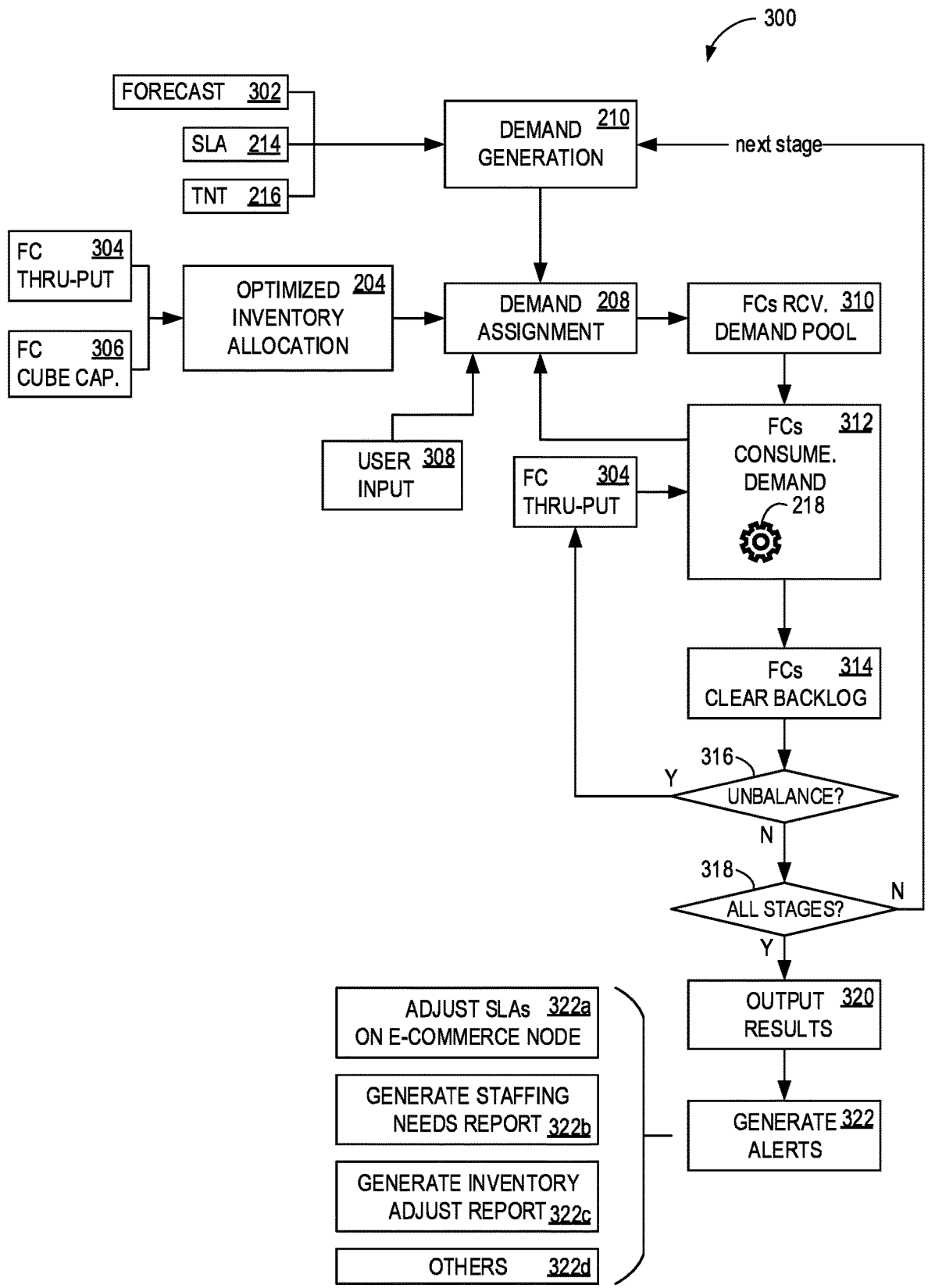
FIG. 3 shows a flow chart representing execution of the simulation framework of FIG. 2.

FIG. 3 shows a flow chart 300 representing activities of simulation framework 200 (e.g., execution of simulation tool 108). An objective function for inventory allocation optimization is to minimize the total weighted TNT, the total weighted distance, and the FC capacity utilization. An exemplary calculation is provided, using the following variables, parameters, constraints, and formulation:

I Set of 3 digit zip codes
P Set of product type
K Set of FCs
Parameters:
$d_{ip}$ Demand quantity from zip code i for product p in cubic
$Zone_{ik}$ Zone from FC k to zip code i
$TNT_{ik}$ TNT from FC k to zip code i
$Cap_k$ Daily unit capacity of FC k
$Cube_k$ Cube capacity of FC k
$Cpu_p$ Cube per unit for product type p
α Trade-off coefficients between the objectives. $\alpha \in [0,1]$
M Penalty term. $M=10^6$
Variables
$x_{ikp}$ Cubic of demand from zip area i shipped to FC k for product type p
$s_1$ Slack variable for unit capacity overflow ratio
$s_2$ Slack variable for cubic capacity overflow ratio
The function to minimize is given by:

$$\Sigma_{i \in I} \Sigma_{k \in K} Zone_{ik} x_{ikp} + \alpha \Sigma_{i \in I} \Sigma_{k \in K} TNT_{ik} x_{ikp} + M\Sigma_{i \in I} \Sigma_{k \in K}(s_1+s_2) \quad \text{Eq.(1)}$$

subject to (s.t.):

$$\Sigma_{k \in K} x_{ikp}/Cpu_p = d_{ip}, \forall i \in I, p \in P \quad \text{Eq.(2)}$$

$$\Sigma_i \Sigma_p (x_{ikp}) = Cube_k(1+s_1), \forall k \in K \quad \text{Eq.(3)}$$

$$\Sigma_i \Sigma_p x_{ikp}/Cpu_p = Cap_k(1+s_2), \forall k \in K \quad \text{Eq.(4)}$$

$$x_{ikp} \geq 0, \forall i \in I, k \in K \quad \text{Eq.(5)}$$

$$s_1 \geq 0, s_2 \geq 0 \quad \text{Eq.(6)}$$

The constraint of Eq. (2) is demand satisfaction. It requires that, for any zip code i, the quantity of demand assigned to feasible FCs sum to the demand from zip code i. The constraint of Eq. (3) is based on FC storage space constraints (e.g., cube capacity). It requires that the spaces taken by demand assigned to an FC (e.g., inventory 122a) should be less than the total space in that FC. The constraint of Eq. (4) is the FC fulfillment capacity constraints. The coefficient a is between 0 and 1, such that the first three terms in the objectives have the same magnitude. Examples may be solved with a linear programming solver.

Optimized inventory allocation 204 intakes an FC throughput capacity 304 and an FC cube capacity 306 in support of the above calculations. Demand generation 210 intakes SLA distribution 214 and TNT distribution 216, as noted for FIG. 2, and also demand forecast 302, which is used to forecast demand for the simulation. In some examples, demand forecast 302 leverages historical and actual customer order data from e-commerce node 130. At each stage of the multi-stage simulation, demand assignment 208 intakes data from optimized inventory allocation 204 and demand generation 210. In some examples, optimized inventory allocation 204 may be static (having only been calculated at the start of the simulation, whereas remain demand generation 210 is updated at each stage of the simulation based at least on results of a prior stage of the simulation. Demand assignment also takes in user input 308, for example from user 138 via UI 114. For example, user 137 may shift order fulfillment among FCs or alter the percentage of orders in each SLA category. In some examples, user input 308 may permit user 138 to control the simulation stepping through various stages, editing simulation parameters 110 at various stages, or permit the simulation to execute automatically to completion.

Shipment deadlines are calculated (e.g., using SLAs and TNTs) and priority scores for each demand fragment are determined. Demand fragments are put into the demand pool for each FC. The FCs receive their demand pools for the current simulation stage at operation 310. In some examples, the shipment deadline is calculated as follows: use the order date and SLA to determine the promised arrival date and use TNT to back calculate the shipment deadline. In some scenarios, the SLA and TNT may have different business day calendars, because TNT is the time in transit by carriers who may have different operating days than FCs. In some examples, lower priority scores are fulfilled first. A priority score may be calculated using the shipment deadline, with 1-day and 2-day SLA demand fragments having a value subtracted to ensure that they will have a lower priority score than 5-day and 7-day SLA demand fragments, even with tight shipping deadlines for the 5-day and 7-day SLA demand fragments. This results in 1-day and 2-day SLA demand fragments being fulfilled ahead of a prior stage's (day's) backlog of 5-day or 7-day SLA demand fragments.

In operation 312, for the current simulation stage, each FCs ranks the demand fragments in its demand pool, based on their priority scores, and consumes the demand fragments, starting with the smallest priority score until no order left in the demand pool or the throughput capacity is reached. Unfulfilled orders become backlogs for each FC/region, and carry over to the next day. In the simulation, an FC consumes a demand fragment by the simulation marking that demand fragment as having been fulfilled (in the simulation—actual real-world fulfillment will occur later). Operation 312 is performed again for each simulation stage.

For any stage of the simulation, if the current backlog for any FC drop down to some threshold (e.g., 25%) of its maximum unit capacity, it may be identified as a clear backlog day for the FC in box 314. Based on the number of clear backlog days for each FC, and average work efficiency (e.g., based at least on units fulfilled per day) the simulation results 112 may be mined to provide guidance on the number of temporary workers need to be hired and the length of hiring during the peak periods, among other network planning data needs. If there is an imbalance among FCs in the clear backlog days, as determined by decision operation 316, FC throughput capacity 304 is used to determine whether a demand fragment should be deferred to a subsequent day (simulation stage) or fulfilled by an alternate FC. Thus, either an alternate FC will consume the demand fragment at 312, or the same FC will consume the demand fragment at a later time.

Decision operation 318 determines whether the simulation has been completed for all stages. If not, then demand generation 210 proceeds to the next stage. If so, simulation tool 108 outputs simulation results at operation 320. Alerts are generated, as planning control logic actions, at operation 322. In some examples, this may include alert 322a, adjusting SLAs (e.g., available SLAs 134a) on e-commerce node 130; alert 322b, generating a staffing needs report with labor scheduling tool 142; alert 322c, generating an inventory adjustment report for inventory allocation component 104 to alter inventory 122a or 122b; or another alert 322d.

Turning to FIGS. 4A-4D, demand and fulfillment timelines provide a graphical illustration of the deferral of backlog to later days (or stages), as described for FIG. 3. In FIG. 4A, a bar graph 400a shows daily (or other simulation stage) demand, plotted as number of units on axis 402 against a time axis 404 for an FC. A simulation period 406 is indicated, showing a peak period 408 that extends for at least a portion of simulation period 406. A daily FC capacity limit 410 is also indicated. A version of the data used to produce bar graph 400a will be generated for each FC. Demand is indicated as either base business demand 420 or seasonal demand 422. As can be seen, seasonal demand 422 results in a total demand exceeding daily FC capacity limit 410 for at least some days.

In FIG. 4B, a bar graph 400b illustrates the same total demand, but identifies demand in terms of capacity units 424 (the number of demand units that fit within the FC's daily capacity) and excess demand 426. Excess demand 426 will be addressed by the multi-stage simulation. In FIG. 4C, a bar graph 400c again shows the total demand, but segmented by SLA, for example, 1-day SLA 431, 2-day SLA 432, 5-day SLA 435, and 7-day SLA 437. As can be seen, the 5-day and 7-day SLA demand fragments are the cause of the total demand exceeding daily FC capacity limit 410.

FIG. 4D shows a bar graph 400d in which 5-day and 7-day SLA demand fragments are pushed to later dates, so that the FC is operating at full capacity for a longer period in order to clear the backlog. However, in this example, the 1-day and 2-day SLA demand fragments are not negatively impacted. In this example, the total demand for the entire simulation period is the same in bar graphs 400c and 400d. Another possible resolution is that some of the demand is pushed to an alternate FC, which would result in bar graph 400d having less total demand than bar graph 400c. Another possible resolution is that staffing is kept at higher levels for longer than initially projected, so that a modified daily FC capacity limit 412 extends peak FC capacity for a longer time period than initially projected in daily FC capacity limit 410. This would occur when an alert identifies a change in staffing levels at the FC.

Figure 5:
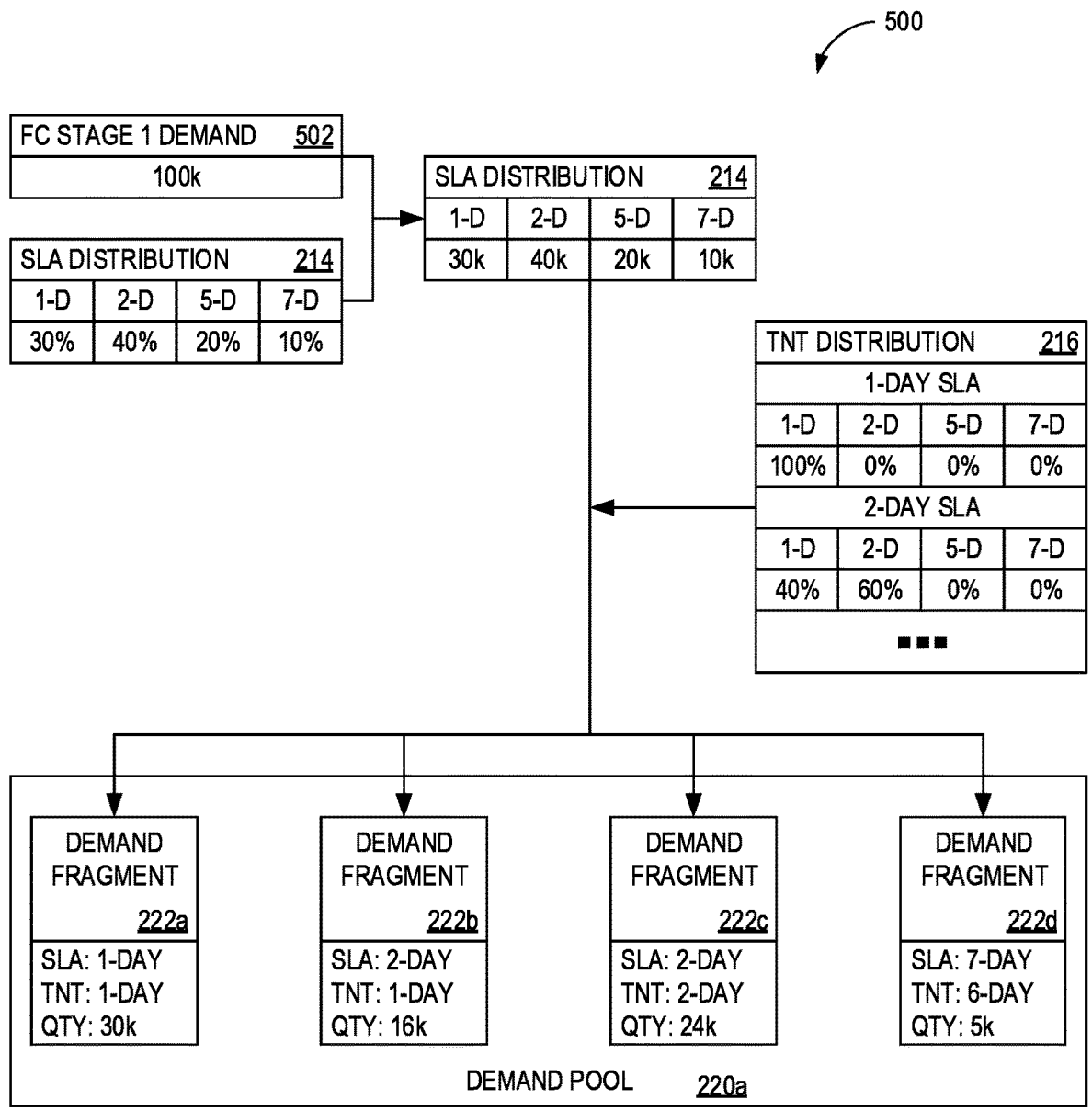
FIG. 5 illustrates exemplary demand generation, as my be performed by the simulation framework of FIG. 2.

FIG. 5 illustrates exemplary demand generation, as my be performed by simulation framework 200. During demand generation, the total forecasted units during the peak period are segmented into daily forecasted units. Using the optimized demand percentage for different FCs, the peak period daily demand from any FC is determined. Using the historical percentage for promised SLA categories, including 1-day, 2-day, 5-day, and 7-day SLA, the demand may be further segmented into different demand fragments with different SLA. An example is provided for a forecast daily demand 502, for a particular FC, of 100,000 units. Forecast daily demand 502 may be a portion of forecast demand 302 of FIG. 1.

SLA distribution 214 is shown in both percentage and raw count versions. An SLA breakdown of [30%; 40%; 20%; 10%] becomes [30,000; 40,000; 20,000; 10,000] for the 100,000 units. TNT distribution 216 is shown with more detail (for only 1-day and 2-day SLA, for clarity). Four demand fragments are illustrated, all with the same shipping deadline. Demand fragment 222a is for 1-day SLA, 1-day TNT, and 30,000 units. The 2-day SLA units are segmented into two demand fragments, because they have different shipping deadlines. Demand fragment 222b is for 2-day SLA, 1-day TNT, and 16,000 units. Demand fragment 222c is for 2-day SLA, 2-day TNT, and 24,000 units. Because it has a longer TNT, demand fragment 222c will need to be fulfilled prior to demand fragment 222b, in order for demand fragment 222c to meet its SLA. Demand fragment 222b has one more day than demand fragment 222c. Another demand fragment 222d is for 7-day SLA, 6-day TNT, and 5,000 units, so additional demand fragments are needed beyond what is shown in FIG. 5.

Figure 6:
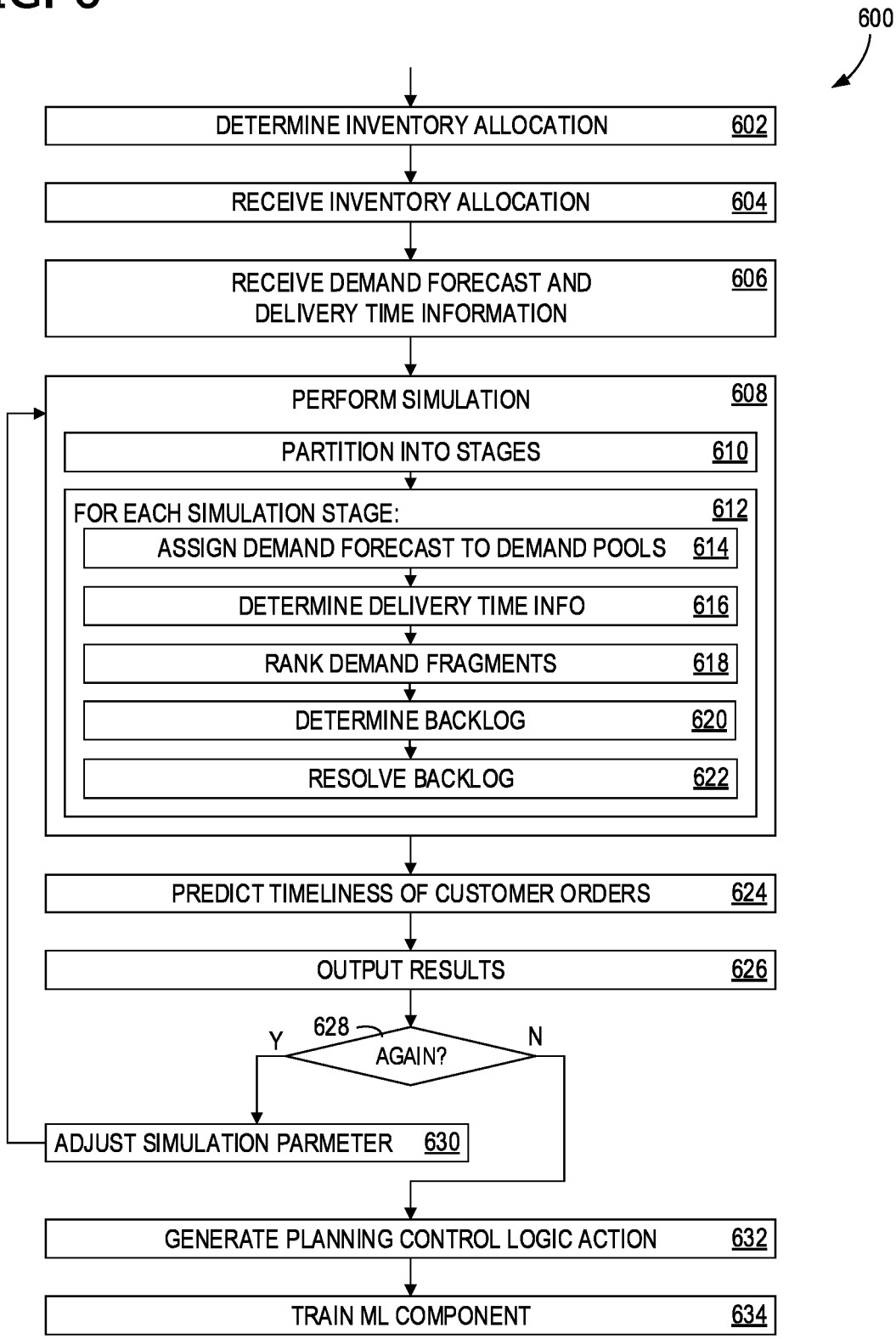
FIG. 6 shows a flow chart of exemplary operations associated with the arrangement of FIG. 1.

FIG. 6 shows a flow chart 600 of exemplary operations associated with arrangement 100. In some examples, some or all of the computer operations described for flow chart 600 are performed as computer-executable instructions on computing node 800 (see FIG. 8). Flow chart 600 commences with operation 602, which includes, for each of a plurality of FCs, determining an inventory allocation based at least on unit rate capacity of the FC or a storage capacity of the FC. Operation 604 includes, for each of the plurality of FCs, receiving the inventory allocation. Operation 606 includes receiving a demand forecast (e.g., demand forecast 302) and delivery time information for customer orders.

The simulation is performed in operation 608, and includes operations 610-622. Operation 610 includes partitioning a simulation period (e.g., simulation period 406) into multiple simulation stages. In some examples, each simulation stage corresponds to a day. Operation 612 includes multiple operations 614-622 that are performed for each simulation stage. Operation 614 includes assigning portions of the demand forecast to a demand pool (e.g., demand pool 220a) for one of the FCs. Operation 616 includes determining delivery time information for at least one demand fragment (e.g., demand fragment 222a). In some examples, determining delivery time information includes determining a shipping deadline. In some examples, determining delivery time information includes determining delivery time information for at least one demand fragment, based at least on an item type in the demand fragment. For example, holiday items may be assigned a 7-day SLA, whereas household items may have a 1-day or 2-day SLA.

Operation 618 includes ranking demand fragments. In some examples, ranking demand fragments includes ranking demand fragments based at least on the shipping deadline. Operation 620 includes, for each FC, determining a backlog, based at least on the demand pool for the FC and a simulation stage fulfillment capacity for the FC. Backlogs are resolved in operation 622. In some examples, operation 622 includes transferring each existing backlog to a subsequent simulation stage or an alternate FC. Operation 624 includes, based at least on the simulation, predicting timeliness of customer order fulfillment.

Simulation results 112 are output in operation 626. If all of the customer orders are timely, then the backlog resolutions worked. If customer orders are not timely, or if user 138 believes further planning optimization is possible, then decision operation 628 moves flow chart 600 to operation 630 which includes, based at least on the predicted timeliness of customer order fulfillment, adjusting a simulation parameter (e.g., one or more of simulation parameters 110) selected from the list consisting of: delivery time information for customer orders, inventory allocation, and simulation stage fulfillment capacity for at least one FC. In some examples, operation 630 includes receiving, through a GUI, a reassignment for at least one portion of the demand forecast from a first FC to a second FC. Flow chart 600 moves back to operation 612 for performing the simulation with the adjusted simulation parameter.

When user 138 is satisfied with simulation results 112, operation 632 includes, based at least on the simulation, generating at least one planning control logic action selected from the list consisting of: a short-term action, a near-term action, and a long-term action. In some examples, the short-term action is selected from the list consisting of: an adjustment to delivery time options available on an e-commerce node, an alert identifying a change in staffing levels at one or more FCs, and a reassignment of at least one portion of the demand forecast to the alternate FC. In some examples, planning tool 106 automatically adjusts an SLA on e-commerce node 130 (e.g., available SLAs 134). In some examples, planning tool 106 automatically adjusts an FC staffing level in labor scheduling tool 142.

In some examples, planning tool 106 automatically requests capacity from transport provider 162. In some examples, the near-term action is selected from the list consisting of: an adjustment to inventory allocation for at least one FC, and an alert identifying a change in staffing pool levels at one or more FCs. In some examples, the long-term action comprises an alert identifying a change in infrastructure capacity for at least one FC. In some examples, a change in infrastructure capacity comprises upgrading or decommissioning equipment, expanding an FC, and/or providing a new FC. Operation 634 includes training ML component 116 using simulation results 112 and actual historical performance, so that future simulations and planning activity may be more accurate.

Figure 7:
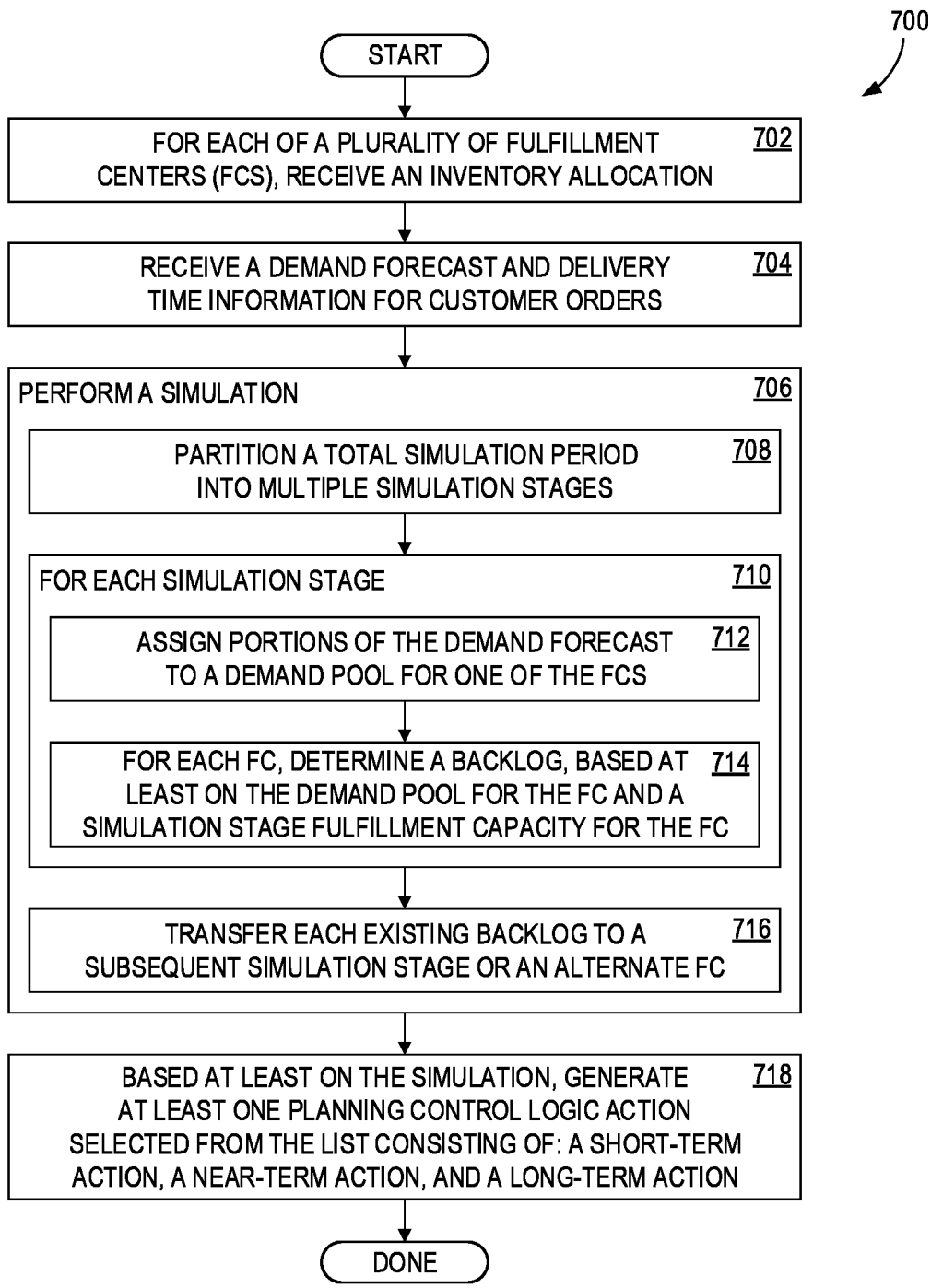
FIG. 7 shows another flow chart of exemplary operations associated with the arrangement of FIG. 1.

FIG. 7 shows a flow chart 700 of exemplary operations associated with arrangement 100 (of FIG. 1). In some examples, some or all of the computer operations described for flow chart 700 are performed as computer-executable instructions on computing node 800 (see FIG. 8). Flow chart 700 commences with operation 702, which includes, for each of a plurality of FCs, receiving an inventory allocation. Operation 704 includes receiving a demand forecast and delivery time information for customer orders. Operation 706 includes performing a simulation comprising operations 708-716. Operation 708 includes partitioning a simulation period into multiple simulation stages. In some examples, each simulation stage corresponds to a day or a business day (e.g., an operating day, excluding holidays).

Operation 710 comprises performing operations 712 and 714 for each simulation stage. Operation 712 includes assigning portions of the demand forecast to a demand pool for one of the FCs. Operation 714 includes, for each FC, determining a backlog, based at least on the demand pool for the FC and a simulation stage fulfillment capacity for the FC. Operation 716 includes transferring each existing backlog to a subsequent simulation stage or an alternate FC. Operation 718 includes based at least on the simulation, generating at least one planning control logic action selected from the list consisting of: a short-term action, a near-term action, and a long-term action. In some examples, the short-term action is selected from the list consisting of: an adjustment to delivery time options available on an e-commerce node, an alert identifying a change in staffing levels at one or more FCs, and a reassignment of at least one portion of the demand forecast to the alternate FC. In some examples, the near-term action is selected from the list consisting of: an adjustment to inventory allocation for at least one FC, and an alert identifying a change in staffing pool levels at one or more FCs. In some examples, the long-term action comprises an alert identifying a change in infrastructure capacity for at least one FC. A change in infrastructure capacity may include upgrading or decommissioning equipment, expanding an FC, and/or providing a new FC.

Exemplary Operating Environment

Figure 8:
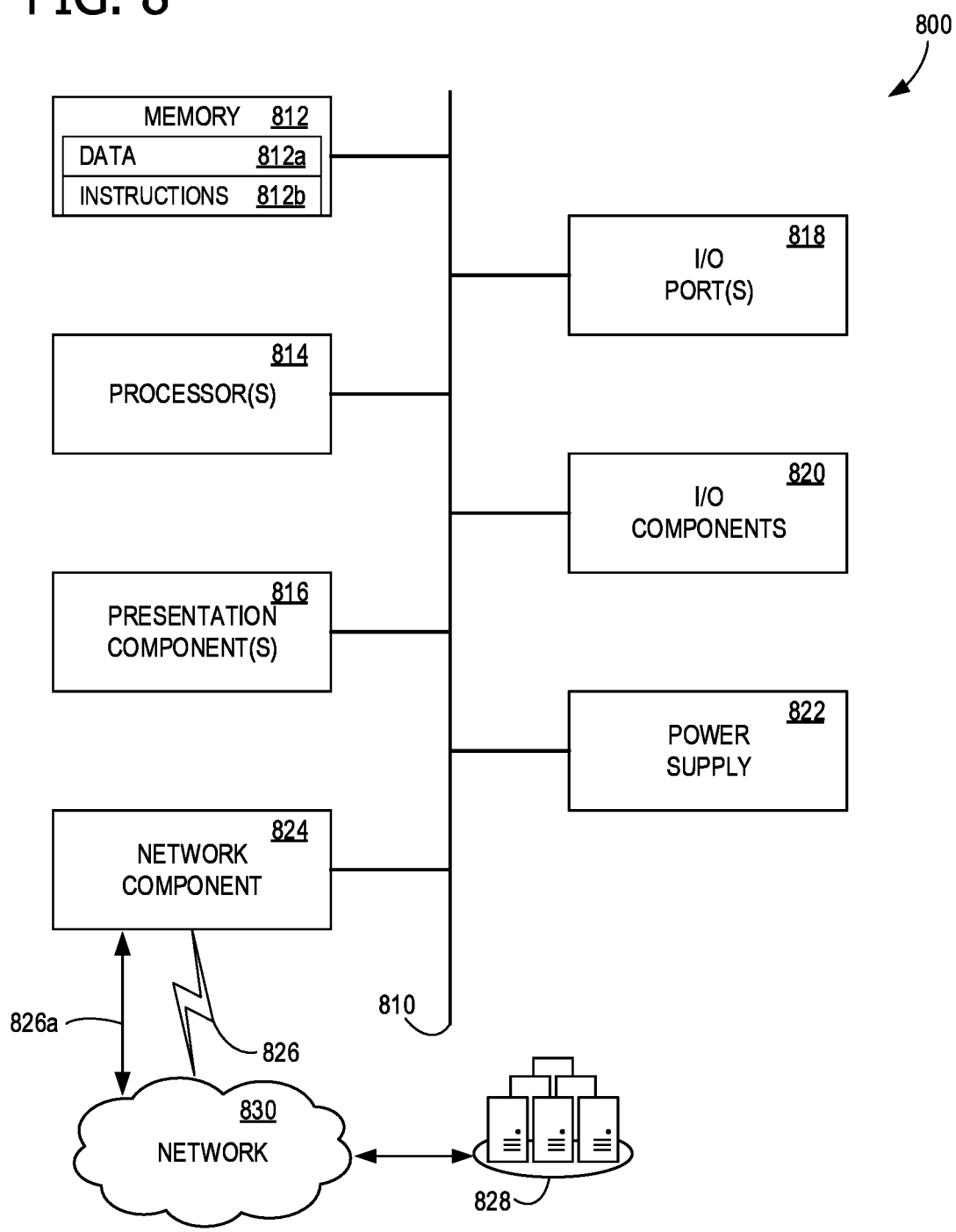
FIG. 8 is a block diagram of an example computing node for implementing aspects disclosed herein.

FIG. 8 is a block diagram of an example computing node 800 for implementing aspects disclosed herein and is designated generally as computing node 800. Computing node 800 is one example of a suitable computing environment and is not intended to suggest any limitation as to the scope of use or functionality of the invention. Neither should the computing node 800 be interpreted as having any dependency or requirement relating to any one or combination of components/modules illustrated. The examples and embodiments disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing nodes, etc. The disclosed examples may also be practiced in distributed computing environments, where tasks are performed by remote-processing devices that are linked through network 830 (e.g., a communications network).

Computing node 800 includes a bus 810 that directly or indirectly couples the following devices: memory 812, one or more processors 814, one or more presentation components 816, input/output (I/O) ports 818, I/O components 820, a power supply 822, and a network component 824. Computing node 800 should not be interpreted as having any dependency or requirement related to any single component or combination of components illustrated therein. While computing node 800 is depicted as a seemingly single device, multiple computing nodes 800 may work together and share the depicted device resources. That is, one or more computer storage devices having computer-executable instructions stored thereon may perform operations disclosed herein. For example, memory 812 may be distributed across multiple devices, processor(s) 814 may provide housed on different devices, and so on.

Bus 810 represents what may be one or more busses (such as an address bus, data bus, or a combination thereof). Although the various blocks of FIG. 8 are shown with lines for the sake of clarity, delineating various components can be accomplished with various other schemes. For example, a presentation component such as a display device can also be classified as an I/O component. Additionally, processors have internal memory. Thus, the diagram of FIG. 8 is merely illustrative of an exemplary computing node that can be used in connection with one or more embodiments. Distinction is not made between such categories as "workstation," "server," "laptop," "hand-held device," etc., as all are contemplated within the scope of FIG. 8 and the references herein to a "computing node" or a "computing device." Memory 812 may include any of the computer-readable media discussed herein. Memory 812 is used to store and access data 812a and instructions 812b operable to carry out the various operations disclosed herein. In some examples, memory 812 includes computer storage media in the form of volatile and/or nonvolatile memory, removable or non-removable memory, data disks in virtual environments, or a combination thereof.

Processor(s) 814 may include any quantity of processing units that read data from various entities, such as memory 812 or I/O components 820. Specifically, processor(s) 814 are programmed to execute computer-executable instructions for implementing aspects of the disclosure. The instructions may be performed by the processor, by multiple processors within the computing node 800, or by a processor external to the client computing node 800. In some examples, the processor(s) 814 are programmed to execute instructions such as those illustrated in the flowcharts discussed below and depicted in the accompanying drawings. Moreover, in some examples, the processor(s) 814 represent an implementation of analog techniques to perform the operations described herein. For example, the operations may be performed by an analog client computing node 800 and/or a digital client computing node 800.

Presentation component(s) 816 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly among multiple computing nodes 800, across a wired connection, or in other ways. Ports 818 allow computing node 800 to be logically coupled to other devices including I/O components 820, some of which may be built in. Example I/O components 820 include, for example but without limitation, a microphone, keyboard, mouse, joystick, game pad, satellite dish, scanner, printer, wireless device, etc.

In some examples, the network component 824 includes a network interface card and/or computer-executable instructions (e.g., a driver) for operating the network interface card. Communication between the computing node 800 and other devices may occur using any protocol or mechanism over any wired or wireless connection. In some examples, the network component 824 is operable to communicate data over public, private, or hybrid (public and private) network 830 using a transfer protocol, between devices wirelessly using short range communication technologies (e.g., near-field communication (NFC), Bluetooth® branded communications, or the like), or a combination thereof. Network component 824 communicates over wireless communication link 826 and/or a wired communication link 826a to a cloud resource 828 across network 830. Various different examples of communication links 826 and 826a include a wireless connection, a wired connection, and/or a dedicated link, and in some examples, at least a portion is routed through the internet.

Although described in connection with an example computing node 800, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing nodes, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device or computing node when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

Exemplary Operating Methods and Systems

An exemplary system for capacity planning comprises: a processor; and a computer-readable medium storing instructions that are operative upon execution by the processor to: for each of a plurality of FCs, receive an inventory allocation; receive a demand forecast and delivery time information for customer orders; perform a simulation comprising: partition a simulation period into multiple simulation stages; for each simulation stage: assign portions of the demand forecast to a demand pool for one of the FCs; for each FC, determine a backlog, based at least on the demand pool for the FC and a simulation stage fulfillment capacity for the FC; and transfer each existing backlog to a subsequent simulation stage or an alternate FC; and based at least on the simulation, generate at least one planning control logic action selected from the list consisting of: a short-term action, a near-term action, and a long-term action.

An exemplary method of capacity planning comprises: for each of a plurality of FCs, receiving an inventory allocation; receiving a demand forecast and delivery time information for customer orders; performing a simulation comprising: partitioning a simulation period into multiple simulation stages; for each simulation stage: assigning portions of the demand forecast to a demand pool for one of the FCs; for each FC, determining a backlog, based at least on the demand pool for the FC and a simulation stage fulfillment capacity for the FC; and transferring each existing backlog to a subsequent simulation stage or an alternate FC; and based at least on the simulation, generating at least one planning control logic action selected from the list consisting of: a short-term action, a near-term action, and a long-term action.

An exemplary computer storage device has computer-executable instructions stored thereon, which, on execution by a computer, cause the computer to perform operations comprising: for each of a plurality of fulfillment centers (FCs), determining an inventory allocation based at least on unit rate capacity of the FC or a storage capacity of the FC; receiving a demand forecast and delivery time information for customer orders; performing a simulation comprising: partitioning a simulation period into multiple daily simulation stages; for each simulation stage: assigning portions of the demand forecast to a demand pool for one of the FCs; for each FC, determining a backlog, based at least on the demand pool for the FC and a simulation stage fulfillment capacity for the FC, wherein determining the backlog for each FC comprises: determining, based at least on the delivery time information and TNT information, a shipping deadline for demand fragments in the demand pool for the FC; and ranking demand fragments based at least on the shipping deadline; and transferring each existing backlog to a subsequent simulation stage or an alternate FC; and based at least on the simulation, generating at least one planning control logic action selected from the list consisting of: a short-term action, a near-term action, and a long-term action, wherein the short-term action is selected from the list consisting of: an adjustment to delivery time options available on an e-commerce node, an alert identifying a change in staffing levels at one or more FCs, and a reassignment of at least one portion of the demand forecast to the alternate FC; wherein the near-term action is selected from the list consisting of: an adjustment to inventory allocation for at least one FC, and an alert identifying a change in staffing pool levels at one or more FCs; and wherein the long-term action comprises an alert identifying a change in infrastructure capacity for at least one FC.

Alternatively, or in addition to the other examples described herein, examples include any combination of the following:

the short-term action is selected from the list consisting of: an adjustment to delivery time options available on an e-commerce node, an alert identifying a change in staffing levels at one or more FCs, and a reassignment of at least one portion of the demand forecast to the alternate FC;

the near-term action is selected from the list consisting of: an adjustment to inventory allocation for at least one FC, and an alert identifying a change in staffing pool levels at one or more FCs;

the long-term action comprises an alert identifying a change in infrastructure capacity for at least one FC;

a change in infrastructure capacity comprises upgrading or decommissioning equipment, expanding an FC, and/or providing a new FC;

each simulation stage corresponds to a day;

based at least on the simulation, predicting timeliness of customer order fulfillment;

based at least on the predicted timeliness of customer order fulfillment, adjusting a simulation parameter selected from the list consisting of: delivery time information for customer orders, inventory allocation, and simulation stage fulfillment capacity for at least one FC;

performing the simulation with the adjusted simulation parameter;

for each of the plurality of FCs, determining the inventory allocation based at least on unit rate capacity of the FC or a storage capacity of the FC;

determining the backlog for each FC comprises determining, based at least on the delivery time information and TNT information, a shipping deadline for demand fragments in the demand pool for the FC;

ranking demand fragments based at least on the shipping deadline;

determining delivery time information for at least one demand fragment;

determining delivery time information for at least one demand fragment, based at least on an item type in the demand fragment;

receiving, through a GUI, a reassignment for at least one portion of the demand forecast from a first FC to a second FC;

an inventory allocation component;

a planning tool, a simulation tool, and/or a rules engine;

the planning tool automatically requests capacity from a transport provider;

the planning tool or the simulation tool comprises an ML component;

an e-commerce node;

the planning tool automatically adjusts an SLA on the e-commerce node;

a labor scheduling tool; and the planning tool automatically adjusts an FC staffing level in the labor scheduling tool.

The order of execution or performance of the operations in examples of the disclosure illustrated and described herein may not be essential, and thus may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense. While the disclosure is susceptible to various modifications and alternative constructions, certain illustrated examples thereof are shown in the drawings and have been described above in detail. It should be understood, however, that there is no intention to limit the disclosure to the specific forms disclosed, but on the contrary, the intention is to cover all modifications, alternative constructions, and equivalents falling within the spirit and scope of the disclosure.

What is claimed is:

1. A system for capacity planning, the system comprising:
   a processor; and
   a computer-readable medium storing instructions that are operative upon execution by the processor to:
   for each of a plurality of fulfillment centers (FCs), receive an inventory allocation, the plurality of FCs collectively comprising a network of FCs;
   receive a demand forecast and delivery time information for customer orders;
   perform, by a machine learning component, a simulation comprising:
   partitioning a simulation period into multiple simulation stages, each simulation stage including a day;
   for each simulation stage:
   assigning portions of the demand forecast to a demand pool for one of the FCs;
   receiving, through a graphical user interface (GUI), an instruction to alter a percentage of orders in each available service level agreement (SLAs) for the simulation stage to simulate a result in the network of FCs, wherein altering the percentage of orders further alters one or more time in transit (TNT) predictions;
   for each FC, determining a backlog at the day, based at least on the demand pool for the FC and a simulation stage fulfillment capacity for the FC; and
   for each FC, produce simulation results regarding timeliness of order fulfillment based on the SLAs for the simulation stage;
   resolving the determined backlog for the each FC in the each simulation stage by transferring each existing backlog to a subsequent simulation stage or an alternate FC;
   training the machine learning component to improve the simulation using results of the performed simulation for the each simulation stage and actual historical performance, and
   planning, by the machine learning component, a future simulation based on the improved simulation by the trained machine learning component, and
   based at least on the improved simulation:
   restrict the available SLAs to adjust available delivery time options available on an e-commerce node by removing unavailable delivery time options, the unavailable delivery times established based at least in part on the produced simulation results regarding the timeliness of the order fulfillment, and
   automatically task a first FC of the plurality of FCs to fulfill an order in place of a second FC of the plurality of FCs based at least in part on a shifted zip code order fulfillment based on an overflow identified at the second FC, wherein the second FC is operating at full capacity such that the order is unable to be fulfilled.

2. The system of claim 1, wherein:
   the instructions are further operable to, based at least in part on the improved simulation, generate at least one planning control logic action selected from the list consisting of a short-term action, a near-term action, and a long-term action,
   the short-term action is selected from the list consisting of:
   a staffing level alert identifying a change in staffing levels at one or more FCs and a reassignment of at least one portion of the demand forecast to the alternate FC;
   the near-term action is selected from the list consisting of:
   an adjustment to inventory allocation for at least one FC, and the staffing level alert identifying the change in staffing pool levels at the one or more FCs; and
   the long-term action comprises an infrastructure capacity alert identifying a change in infrastructure capacity for at least one FC.

3. The system of claim 1, wherein:
   the instructions are further operable to present, through the GUI, the available delivery time options corresponding to the restricted available SLAs.

4. The system of claim 1 wherein the instructions are further operable to:
   based at least on the simulation, predict the timeliness of the order fulfillment, and
   for each simulation stage, to resolve the determined backlog for the each FC in the simulation stage, further delay fulfillment of the customer order having a promised delivery time longer than a second customer order.

5. The system of claim 4 wherein the instructions are further operable to:
based at least on the predicted timeliness of customer order fulfillment, adjust a simulation parameter selected from the list consisting of:
delivery time information for customer orders, inventory allocation, and simulation stage fulfillment capacity for at least one FC; and
perform the simulation with the adjusted simulation parameter.

6. The system of claim 1 wherein the instructions are further operable to:
for each of the plurality of FCs, determine the inventory allocation based at least on unit rate capacity of the FC or a storage capacity of the FC.

7. The system of claim 1 wherein determining the backlog for each FC comprises:
determining, based at least on the delivery time information and TNT information, a shipping deadline for each demand fragments in the demand pool for the FC;
determining a priority score for each of the demand fragments based at least in part on the determined shipping deadline for each of the demand fragments; and
ranking the demand fragments based at least on the determined priority scores.

8. The system of claim 1 wherein the instructions are further operable to:
determine delivery time information for at least one demand fragment, based at least on an item type in the demand fragment.

9. The system of claim 1 wherein the instructions are further operable to:
receive, through the GUI, the shifted zip code order fulfillment based on the overflow identified at the second FC of the plurality of FCs.

10. A method of capacity planning, the method comprising:
for each of a plurality of fulfillment centers (FCs), receiving an inventory allocation, the plurality of FCs collectively comprising a network of FCs;
receiving a demand forecast and delivery time information for customer orders;
performing, by a machine learning component, a simulation comprising:
partitioning a simulation period into multiple simulation stages, each simulation stage including a day;
for each simulation stage:
assigning portions of the demand forecast to a demand pool for one of the FCs;
receiving, through a graphical user interface (GUI), an instruction to alter a percentage of orders in each available service level agreement (SLAs) for the simulation stage to simulate a result in the network of FCs, wherein altering the percentage of orders further alters one or more time in transit (TNT) predictions;
for each FC, determining a backlog at the day, based at least on the demand pool for the FC and a simulation stage fulfillment capacity for the FC; and
for each FC, producing simulation results regarding timeliness of order fulfillment based on the SLAs for the simulation stage;
resolving the determined backlog for the each FC in the each simulation stage by transferring each existing backlog to a subsequent simulation stage or an alternate FC;
training the machine learning component to improve the simulation using results of the performed simulation for the each simulation stage and actual historical performance and
planning, by the machine learning component, a future simulation based on the improved simulation by the trained machine learning component, and
based at least on the improved simulation:
restricting the available SLAs to adjust available delivery time options available on an e-commerce node by removing unavailable delivery time options, the unavailable delivery times established based at least in part on the produced simulation results regarding the timeliness of the order fulfillment, and
automatically tasking a first FC of the plurality of FCs to fulfill an order in place of a second FC of the plurality of FCs based at least in part on a shifted zip code order fulfillment based on an overflow identified at the second FC, wherein the second FC is operating at full capacity such that the order is unable to be fulfilled.

11. The method of claim 10, further comprising generating at least one planning control logic action selected from the list consisting of a short-term action, a near-term action, and a long-term action,
wherein the short-term action is selected from the list consisting of:
an alert identifying a change in staffing levels at one or more FCs and a reassignment of at least one portion of the demand forecast to the alternate FC;
wherein the near-term action is selected from the list consisting of:
an adjustment to inventory allocation for at least one FC, and an alert identifying a change in staffing pool levels at one or more FCs; and
wherein the long-term action comprises an alert identifying a change in infrastructure capacity for at least one FC.

12. The method of claim 10, further comprising:
based at least on the produced simulation results, predicting the timeliness of the order fulfillment.

13. The method of claim 12, further comprising:
based at least on the predicted timeliness of customer order fulfillment, adjusting a simulation parameter selected from the list consisting of:
delivery time information for customer orders, inventory allocation, and simulation stage fulfillment capacity for at least one FC; and
performing the simulation with the adjusted simulation parameter.

14. The method of claim 10, further comprising:
for each of the plurality of FCs, determining the inventory allocation based at least on unit rate capacity of the FC or a storage capacity of the FC.

15. The method of claim 10, wherein determining the backlog for each FC comprises:
determining, based at least on the delivery time information and TNT information, a shipping deadline for demand fragments in the demand pool for the FC; and
ranking demand fragments based at least on the shipping deadline.

16. The method of claim 10, further comprising:
determining delivery time information for at least one demand fragment, based at least on an item type in the demand fragment.

17. The method of claim 10, further comprising:
receiving, through the GUI, a shifted zip code order fulfillment based on an overflow identified at one FC of the plurality of FCs.

18. One or more computer storage devices having computer-executable instructions stored thereon, which, on execution by a computer, cause the computer to perform operations comprising:
for each of a plurality of fulfillment centers (FCs), determining an inventory allocation based at least on unit rate capacity of the FC or a storage capacity of the FC, the plurality of FCs collectively comprising a network of FCs;
receiving a demand forecast and delivery time information for customer orders;
performing, by a machine learning component, a simulation comprising:
partitioning a simulation period into multiple daily simulation stages, each simulation stage including a day;
for each simulation stage:
assigning portions of the demand forecast to a demand pool for one of the FCs;
receiving, through a graphical user interface (GUI), an instruction to alter a percentage of orders in each available service level agreement (SLAs) for the simulation stage to simulate a result in the network of FCs, wherein altering the percentage of orders further alters one or more time in transit (TNT) predictions;
for each FC, determining a backlog at the day, based at least on the demand pool for the FC and a simulation stage fulfillment capacity for the FC, wherein determining the backlog for each FC comprises:
determining, based at least on the delivery time information and TNT information, a shipping deadline for demand fragments in the demand pool for the FC; and
ranking demand fragments based at least on the shipping deadline; and
for each FC, producing simulation results regarding timeliness of order fulfillment based on the SLAs for the simulation stage; and
resolving the determined backlog for the each FC in the each simulation stage by transferring each existing backlog to a subsequent simulation stage or an alternate FC;
training the machine learning component to improve the simulation using results of the performed simulation for the each simulation stage and actual historical performance; and
planning, by the machine learning component, a future simulation based on the improved simulation by the machine learning component, and
based at least on the improved simulation:
restricting the available SLAs to adjust available delivery time options available on an e-commerce node by removing unavailable delivery time options, the unavailable delivery times established based at least in part on the produced simulation results regarding the timeliness of the order fulfillment,
automatically tasking a first FC of the plurality of FCs to fulfill an order in place of a second FC of the plurality of FCs based at least in part on a shifted zip code order fulfillment based on an overflow identified at the second options at the first FC, wherein the second FC is operating at full capacity such that the order is unable to be fulfilled, and
generating at least one planning control logic action selected from the list consisting of:
a short-term action, a near-term action, and a long-term action, wherein the near-term action is selected from the list consisting of:
an adjustment to inventory allocation for at least one FC, and an alert identifying a change in staffing pool levels at one or more FCs; and
wherein the long-term action comprises an alert identifying a change in infrastructure capacity for at least one FC.

19. The one or more computer storage devices of claim 18 wherein the operations further comprise:
based at least on the produced simulation results, predicting the timeliness of the order fulfillment;
based at least on the predicted timeliness of customer order fulfillment, adjusting a simulation parameter selected from the list consisting of:
delivery time information for customer orders, inventory allocation, and simulation stage fulfillment capacity for at least one FC; and
performing the simulation with the adjusted simulation parameter.

* * * * *